US011138379B2

(12) United States Patent
Boekweg

(10) Patent No.: US 11,138,379 B2
(45) Date of Patent: Oct. 5, 2021

(54) DETERMINATION OF TRANSCRIPTION ACCURACY

(71) Applicant: Sorenson IP Holdings, LLC, Salt Lake City, UT (US)

(72) Inventor: Scott Boekweg, South Jordan, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 98 days.

(21) Appl. No.: 16/394,316

(22) Filed: Apr. 25, 2019

(65) Prior Publication Data

US 2020/0342057 A1    Oct. 29, 2020

(51) Int. Cl.
G10L 15/26        (2006.01)
G06F 40/30       (2020.01)
G10L 15/18        (2013.01)

(52) U.S. Cl.
CPC .......... *G06F 40/30* (2020.01); *G10L 15/1815* (2013.01); *G10L 15/26* (2013.01)

(58) Field of Classification Search
CPC .......................... G10L 15/26; G10L 2015/088
USPC ............................................................ 704/9
See application file for complete search history.

(56) References Cited

U.S. PATENT DOCUMENTS

| 6,638,217 | B1 | 10/2003 | Liberman |
| 2003/0212547 | A1 | 11/2003 | Engelke et al. |
| 2007/0208569 | A1 | 9/2007 | Subramanian et al. |
| 2013/0018656 | A1* | 1/2013 | White ................... G10L 15/30 704/235 |
| 2016/0321401 | A1 | 11/2016 | Buil et al. |
| 2016/0353056 | A1* | 12/2016 | Cullen .................. H04N 7/147 |
| 2017/0147202 | A1 | 5/2017 | Donohue |
| 2017/0169812 | A1* | 6/2017 | Lample ................ G06F 40/279 |
| 2018/0068653 | A1 | 3/2018 | Trawick et al. |
| 2018/0199113 | A1 | 7/2018 | Chou et al. |
| 2018/0253992 | A1 | 9/2018 | Koul et al. |
| 2018/0293221 | A1 | 10/2018 | Finkelstein et al. |
| 2018/0350390 | A1 | 12/2018 | Shellef et al. |

OTHER PUBLICATIONS

S. Narayanan and P. G. Georgiou, "Behavioral Signal Processing: Deriving Human Behavioral Informatics From Speech and Language," in Proceedings of the IEEE, vol. 101, No. 5, pp. 1203-1233, May 2013, doi: 10.1109/JPROC.2012.2236291. (Year: 2013).*

* cited by examiner

Primary Examiner — Bharatkumar S Shah
(74) Attorney, Agent, or Firm — Maschoff Brennan

(57) ABSTRACT

A method may include obtaining audio of a communication session between a first device of a first user and a second device of a second user. The method may further include obtaining a transcription of second speech of the second user. The method may also include identifying one or more first sound characteristics of first speech of the first user. The method may also include identifying one or more first words indicating a lack of understanding in the first speech. The method may further include determining an experienced emotion of the first user based on the one or more first sound characteristics. The method may also include determining an accuracy of the transcription of the second speech based on the experienced emotion and the one or more first words.

20 Claims, 4 Drawing Sheets

DETERMINATION OF TRANSCRIPTION ACCURACY

FIELD

The embodiments discussed herein are related to determination of transcription accuracy.

BACKGROUND

Modern telecommunication services provide features to assist those who are deaf or hearing-impaired. One such feature is a text captioned telephone system for the hearing-impaired. A text captioned telephone system may include a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include obtaining audio of a communication session between a first device of a first user and a second device of a second user. The method may further include obtaining a transcription of second speech of the second user. The method may also include identifying one or more first sound characteristics of first speech of the first user. The method may also include identifying one or more first words indicating a lack of understanding in the first speech. The method may further include determining an experienced emotion of the first user based on the one or more first sound characteristics. The method may also include determining an accuracy of the transcription of the second speech based on the experienced emotion and the one or more first words.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
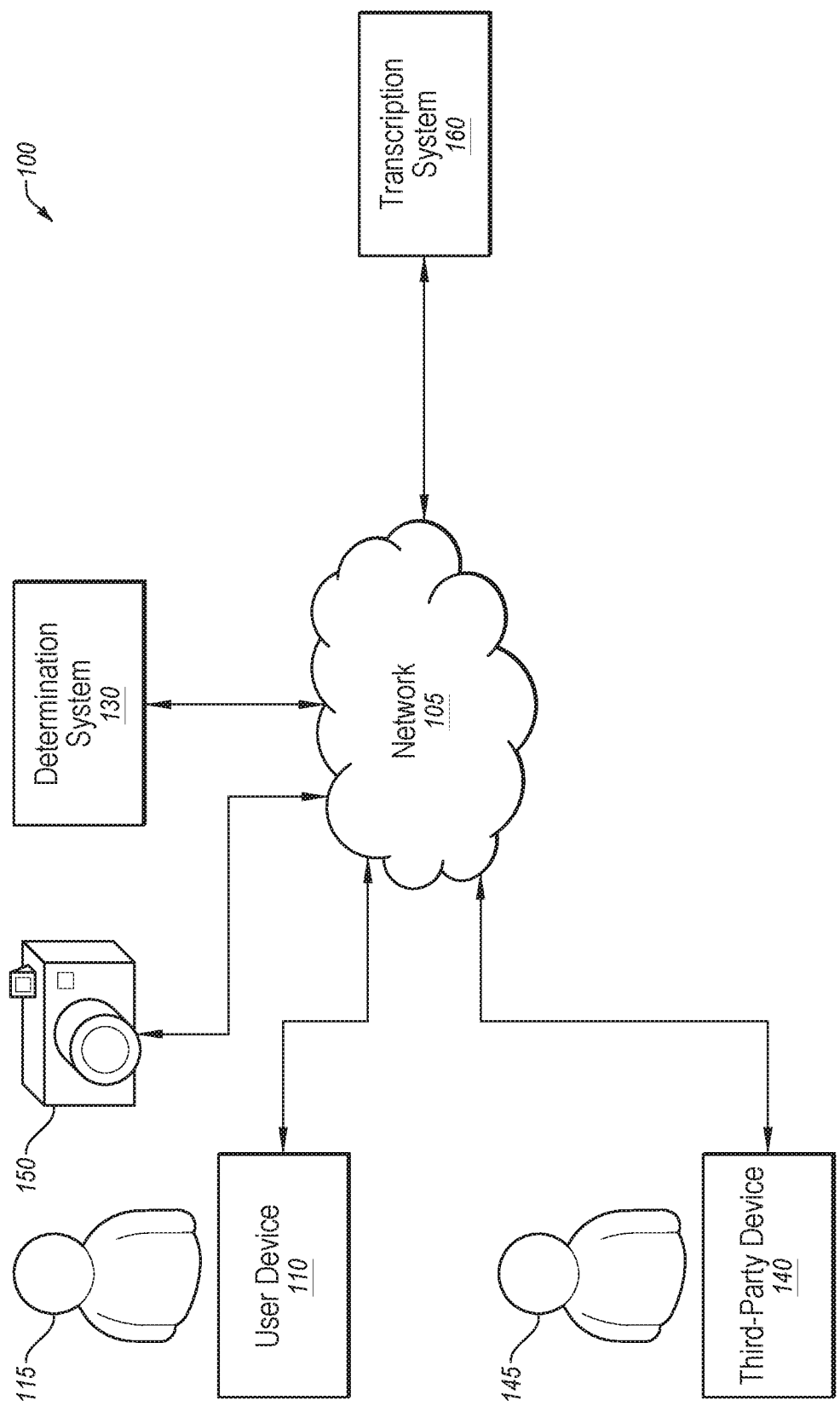
FIG. 1 illustrates an example environment to verify transcriptions of a communication session.

Some embodiments in this disclosure relate to a method and/or system that may verify the transcriptions of a communication session. In these and other embodiments, the transcriptions may include the text of the words spoken by one or more parties in a communication session. Transcriptions of a communication session may include inaccuracies. For example, a participant in a communication session may speak quickly such that a transcription system misses one or more words spoken or incorrectly transcribes one or more words spoken. Alternatively, a transcription system may be configured to understand particular accents and may be less accurate with other accents. For example, a participant in a communication session may speak quickly and may also have an accent for which a transcription system is not configured. The transcription system may generate a transcription of the participant's speech in the communication session but may not accurately capture each of the participant's words. In some embodiments, errors in transcriptions may also occur because of background noise in the communication session, such as multiple participants speaking at the same time or outside noise such as, for example, vehicular traffic, animals, children, or wind.

Some embodiments in this disclosure describe a system that may be configured to verify transcriptions of communication sessions. In some embodiments, verifying transcriptions may include determining the accuracy of transcriptions of communication sessions. For example, a user may participate in a communication session by reading from a transcription of a third-party user's speech and speaking to the third-party user. The system may obtain audio of a communication session, which may include speech of the user and the third-party user. The system may also obtain a transcription of the audio. In some embodiments, the system may determine the accuracy of the transcription based on the emotions experienced by the user and words indicating a lack of understanding by the user. For example, if the user is experiencing a frustrated or angry emotion, the system may determine the transcription of the communication session is less accurate than if the user is experiencing happiness or no frustration. Alternatively, if the user uses many words indicating a lack of understanding, the system may determine that the transcription of the communication session is not accurate.

In some embodiments, the system may be configured to obtain data from the third-party user and may determine the accuracy of the transcription based on the data from the third-party user together with the data from the user. In some embodiments, the accuracy of the transcription may be provided to a transcription system that generated the transcription. The accuracy of the transcription may assist the transcription system to improve the accuracy of the transcription. In some embodiments, the transcription system may be an automated transcription system. Alternately or additionally, the transcription system may be a re-voiced transcription system that generates the transcription based on a re-voicing of the audio by a human operator. In these and other embodiments, the accuracy of the transcription may be presented to the human operator to improve the ability of the human operator to re-voice the communication session.

In some embodiments, the systems and/or methods described in this disclosure may thus help to determine the accuracy of a transcription of a communication session and may help to improve transcribing communication sessions. Thus, the systems and/or methods described in this disclosure may provide at least a technical solution to a technical problem associated with the transcription of communication sessions in the technology of telecommunications.

FIG. 1 illustrates an example environment 100 to verify transcriptions of a communication session. The environment 100 may be arranged in accordance with at least one embodiment described in the present disclosure. The environment 100 may include a network 105, a user device 110 associated with a user 115, a determination system 130, a third-party device 140 associated with a third-party user 145, a camera 150, and a transcription system 160.

The network 105 may be configured to communicatively couple one or more of the user device 110, the determination system 130, the third-party device 140, the camera 150, and the transcription system 160 with one or more of the user device 110, the determination system 130, the third-party device 140, the camera 150, and the transcription system 160. For example, the user device 110 may be communicatively coupled with the third-party device 140 by way of the network 105 and may be communicatively coupled with the transcription system 160. However, the transcription system 160 may not be communicatively coupled with the third-party device 140.

In some embodiments, the network 105 may be any network or configuration of networks configured to send and receive communications between systems and devices. In some embodiments, the network 105 may include a wired network or wireless network, and may have numerous different configurations. In some embodiments, the network 105 may also be coupled to or may include portions of a telecommunications network, including wireless telecommunications, voice over internet protocol networks, and telephone lines such as a public switch telephone network (PSTN) line, for sending data in a variety of different communication protocols, such as a protocol used by a plain old telephone system (POTS), cellular and data networks, such as long-term evolution (LTE) networks and 5G networks, among other protocols.

Each of the user device 110 and the third-party device 140 may be any electronic or digital computing device. For example, each of the user device 110 and the third-party device 140 may include a desktop computer, a laptop computer, a smartphone, a mobile phone, a tablet computer, a telephone, a phone console, or any other computing device. In some embodiments, the user device 110 may be a captioning telephone that is configured to present transcriptions of a communication session, such as one of the CaptionCall® 57T model family or 67T model family of captioning telephones or a device running the CaptionCall® mobile app. For example, in some embodiments, the user device 110 may include a visual display that is integral with the user device 110 and that is configured to present text transcriptions of a communication session.

In some embodiments, the user device 110 and the third-party device 140 may be configured to establish communication sessions with other devices. For example, each of the user device 110 and the third-party device 140 may be configured to establish an outgoing audio or video call with another device. For example, the audio call may be a telephone call over a wireless cellular network, a wired Ethernet network, an optical network, or a POTS line. For example, the user device 110 may communicate over a wireless cellular network and the third-party device 140 may communicate over a PSTN line. Alternatively or additionally, the user device 110 and the third-party device 140 may communicate over other wired or wireless networks that do not include or only partially include a PSTN. For example, a telephone call or communication session between the user device 110 and the third-party device 140 may be a Voice over Internet Protocol (VoIP) telephone call.

In some embodiments, each of the user device 110 and the third-party device 140 may be configured to obtain audio during a communication session. The audio may be part of a video communication or an audio communication. As used in this disclosure, the term audio may be used generically to refer to sounds that may include spoken words. Furthermore, the term audio may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the user device 110 may be configured to obtain first audio from a user 115. In some embodiments, the user 115 may be a hearing-impaired user. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others. Alternatively or additionally, in some embodiments, the user 115 may not be a hearing-impaired user.

The first audio may include speech of the user 115. The speech of the user 115 may be words spoken by the user 115. For example, the user device 110 may obtain speech of the user 115 from a microphone of the user device 110 or from another device that is communicatively coupled to the user device 110.

The third-party device 140 may also be configured to obtain second audio from a third-party user 145. The second audio may include speech of the third-party user 145. The speech of the third-party user 145 may be words spoken by the third-party user 145. In some embodiments, the third-party device 140 may obtain the second audio from a microphone of the third-party device 140 or from another device communicatively coupled to the third-party device 140. During the communication session, the user device 110 may provide the first audio obtained by the third-party device 140. Alternatively or additionally, the third-party device 140 may provide the second audio obtained by the user device 110. Thus, during a communication session, both the user device 110 and the third-party device 140 may obtain both the first audio from the user 115 and the second audio from the third-party user 145.

One or both of the user device 110 and the third-party device 140 may be configured to provide the first audio, the second audio, or both the first audio and the second audio to the determination system 130 and/or the transcription system 160.

In some embodiments, the transcription system 160 may be configured to obtain a transcription of audio received from either one or both of the user device 110 and the third-party device 140. The transcription system 160 may also provide the transcription of the audio to either one or both of the user device 110 and the third-party device 140. Alternately or additionally, the transcription system 160 may provide the transcription to the determination system 130.

Either one or both of the user device 110 and the third-party device 140 may be configured to present the transcription received from the transcription system 160. For example, the user device 110 may be configured to display the received transcriptions on a display that is part of the user device 110 or that is communicatively coupled to the user device 110.

In some embodiments, the transcription system 160 may include a speech recognition system. The speech recognition system may be configured to generate transcriptions from audio. In these and other embodiments, the speech recognition system may include any configuration of hardware, such as processors, servers, and database servers that are networked together and configured to perform a task. For example, the speech recognition system may include one or multiple computing systems, such as multiple servers that each include memory and at least one processor. Alternately or additionally, the speech recognition system may be separate from the transcription system 160 and may provide the transcriptions to the transcription system 160.

In some embodiments, the speech recognition system may be an automatic system that automatically recognizes speech independent of human interaction to generate the transcription. In these and other embodiments, the speech recognition system may include speech engines that are trained to recognize speech. The speech engine may be trained for general speech and not specifically trained using speech patterns of the participants in the communication session. Alternatively or additionally, the speech engine may be specifically trained using speech patterns of one or both of the participants of the communication session.

Alternatively or additionally, the speech recognition system may be a re-voicing system. In these and other embodiments, the speech recognition system may broadcast the audio and obtain a re-voicing of the audio as re-voiced audio. In these and other embodiments, a person may listen to the broadcast audio and re-speak the words of the audio. The re-spoken words may be the re-voiced audio. The speech recognition system may provide the re-voiced audio to a speech engine that is trained for the person. The speech engine may generate the transcription.

In these and other embodiments, the speech recognition system may be configured to recognize speech in the audio. Based on the recognized speech, the speech recognition system may generate the transcription of the speech. The transcription may be a written version of the speech in the audio. The transcription system 160 may provide the transcription of the speech to one or more of the user device 110, the third-party user 145, and/or the determination system 130.

In some embodiments, the speech recognition system may be configured to receive the audio in real-time or substantially real-time. In these and other embodiments, the speech recognition system may be configured to generate the transcription in real-time or substantially real-time.

The camera 150 may be a still or video camera positioned to record images of the user 115. For example, in some embodiments, the camera 150 may record images of the face of the user 115. In these and other embodiments, the camera 150 may record images of the user 115 during a communication session between the user 115 and a third-party user 145. In some embodiments, the camera 150 may record images of the user 115 outside of the visible spectrum of light, such as infrared images or x-ray images. In some embodiments, the environment 100 may include multiple cameras 150. For example, in some embodiments, the camera 150 may be positioned to record images of the user 115 and another camera may be positioned to record images of the third-party user 145. In some embodiments, the camera 150 may be a part of the user device 110 and/or the third-party device 140. For example, in some embodiments, the user device 110 may be a smart cellular telephone device and the camera 150 may be a front-facing camera near a screen of the device. In some embodiments, the camera 150 and/or the other camera may record multiple images. The multiple images may be recorded sequentially to form a video.

The determination system 130 may be configured to determine the accuracy of a transcription of audio from a communication session between the user device 110 and the third-party device 140. The transcription of the audio may be generated by the transcription system 160. In some embodiments, the determination system 130 may include any configuration of hardware, such as processors, servers, and database servers that are networked together and configured to perform a task. For example, the determination system 130 may include one or multiple computing systems, such as multiple servers that each include memory and at least one processor.

In some embodiments, audio of a communication session between the user device 110 and the third-party device 140 may be provided to the determination system 130. Alternately or additionally, the determination system 130 may obtain images of the user 115 and/or the third-party user 145. Alternately or additionally, the determination system 130 may obtain the transcription of the audio of the communication session. In some embodiments, the determination system 130 may use the audio, the images, and/or the transcription of the audio to determine the accuracy of the transcription.

For example, in some embodiments, the determination system 130 may be configured to determine the accuracy of the transcription based on the audio of the communication session. In these and other embodiments, the determination system 130 may determine an emotion of the user 115 and/or the third-party user 145 using the audio of the communication session. Based on the emotion of the user 115, the determination system 130 may determine the accuracy of the transcription. For example, when the determined emotion of the user 115 and/or the third-party user 145 indicates irritation, anger, or other analogous type emotions, the determination system 130 may determine that the accuracy of the transcription is below a threshold or lower than an expected accuracy of the transcription because the lower accuracy of the transcription may cause the determined emotion of the user 115 and/or the third-party user 145.

In these and other embodiments, the audio may include speech of the user 115 and speech of the third-party user 145. The speech of the user 115 and the speech of the third-party user 145 may include multiple sound characteristics. For example, the sound characteristics of the speech of the user 115 may include a tone, a volume, a pitch, an inflection, a timbre, and a speed. The tone may include a particular pitch or change of pitch of the speech, where the pitch represents how "low" or "high" the sound is based on the frequency of the sound vibrations. A greater frequency such as 16 kilo-Hertz (kHz) may correspond with a higher pitch than a lower frequency such as 100 Hertz (Hz). The volume of the speech is the loudness of the speech. Inflection may include changes in the pitch or volume of speech. For example, inflection may include an increasing volume of speech or a decreasing pitch of speech. Timbre may include the perceived quality of different sounds. For example, the timbre of a trumpet may be different from the timbre of a flute. The speech of one individual may have a different timbre than the speech of another individual. The speed of the speech may include how many words per minute an individual is saying. For example, in ordinary speech in English, an individual may average speaking approximately one hundred and thirty words per minute.

An individual may alter his or her speech in response to different emotions or in an attempt to increase the understanding of other parties to a conversation. For example, an individual may alter the speed at which he or she speaks if the individual is agitated, frustrated, confused, or perceives that he or she is not understanding another person or is not being understood by the other person. An individual who perceives that he or she is not being understood by another person may increase the volume and reduce the speed of his or her speech. Additionally, if an individual is angry, the individual may increase the volume and increase the speed of his or her speech.

In some embodiments, the determination system 130 may identify multiple sound characteristics in the speech of the user 115. For example, the determination system 130 may identify the tones, volumes, pitches, inflections, timbres, and speeds of the speech of the user 115 during the course of a communication session. The determination system 130 may include a sound-level meter and a frequency analyzer. The sound-level meter may determine a volume of the speech. The frequency analyzer may determine the wave pattern of the speech. Using the wave pattern of the speech, the determination system 130 may determine the tone, pitch, inflection, timbre, and other aspects of the speech.

In some embodiments, the determination system 130 may be configured to determine emotions of the user 115 based on the sound characteristics of the speech of the user 115. For example, if the determination system 130 determines that the user 115 is speaking loudly with a pitch that reflects agitation, the determination system 130 may determine that the user 115 is upset and that the transcriptions are inaccurate.

In some embodiments, the sound characteristics of the speech may vary over the course of the communication in response to external factors or in response to the content of the communication session. For example, the user 115 may speak more loudly if the user 115 is in a noisy environment than the user 115 would speak in a quiet environment. Additionally, the user 115 may speak more loudly in response to the third-party user 145 requesting the user 115 to speak up. In these and other embodiments, the determination system 130 may consider the external factors or content of the communication session when determining the accuracy of the transcription based on the speech of the user 115.

In these and other embodiments, the determination system 130 may determine that the user 115 is experiencing a particular emotion by using a machine learning algorithm. For example, in some embodiments, the determination system 130 may use hidden Markov models (HMM), dynamic time warping (DTW)-based speech recognition, neural networks, deep feedforward and recurrent neural networks, or other forms of machine learning to develop a machine learning model that determines emotions that the user 115 may be experiencing based on the sound characteristics of the speech of the user 115. For example, the determination system 130 may determine that a rising volume of the speech of the user 115 indicates that the user 115 is frustrated. Based on the indication that the user 115 is frustrated, the determination system 130 may determine the accuracy of the transcription.

In some embodiments, the determination system 130 may develop a machine learning model that may be used to determine the accuracy of the transcription that uses as an input the emotion of the user 115 and external factors or content of the communication session. In these and other embodiments, the determined emotion of the user 115, the content of the communication session based on the transcription, and the external factors, such as the background noise in the audio and the time of day, may be provided to the machine learning model. The machine learning model may make a determination of whether the transcription is accurate or inaccurate with a confidence score. When the machine learning model indicates that the transcription includes inaccuracies with a confidence score above a threshold, the determination system 130 may determine that the transcription is inaccurate. In these and other embodiments, a determination that the transcription is inaccurate may indicate that the transcription includes one or more inaccurate words and one or more accurate words. For example, a determination that the transcription is inaccurate may indicate that enough of the words of the transcription or enough of those words that provide context of the transcription are inaccurate to reduce the ability to understand the transcription and/or understand the context of the conversation reflected in the transcription even when many of the words of the transcription are an accurate transcription.

In some embodiments, the determination system 130 may also obtain image data of the communication session between the user device 110 and the third-party device 140 from the camera 150. As described above, the image data may include still images or video of the user 115 both in the range of light visible to human eyes and outside the range of visible light. The image data may include images of the face of the user 115. In some embodiments, the determination system 130 may be configured to identify facial expressions of the user 115 based on the image data. For example, in some embodiments, the determination system 130 may use artificial intelligence algorithms such as, for example, classification algorithms including neural networks, decision trees, and quadratic discriminant analysis; clustering algorithms including K-means clustering and deep learning models; ensemble learning algorithms including ensemble averaging; Bayesian networks; Markov random fields; regression algorithms including Gaussian process regression; sequence labelling algorithms; and other machine learning algorithms, to identify facial expressions of the user 115 based on the image data. In these and other embodiments, the determination system 130 may identify facial expressions of the user 115 including smiles, frowns, puzzled expressions, furrowed brows, combinations of features of eyebrows and lips suggesting anger or frustration, and other facial expressions. In these and other embodiments, facial expressions of the user 115 may include the positioning of the lips, eyebrows, eyes, chin, nostrils, nose, ears, and/or other modifications of the facial features of the user 115.

In some embodiments, the determination system 130 may determine that the user 115 is experiencing multiple different emotions based on the sound characteristics and the facial expressions. For example, the determination system 130 may determine the user 115 is experiencing anger during the communication session based on the tone of voice of the user 115 and based on the user 115 drawing in his eyebrows, lowering his eyebrows, pressing his lips firmly, and/or bulging his eyes. Alternatively or additionally, in some embodiments, the determination system 130 may determine the user 115 is experiencing surprise based on the user 115 opening her eyes wide, arching her eyebrows, and/or dropping her jaw. In some embodiments, the determination system 130 may determine the user 115 is experiencing frustration based on the user 115 pressing his lips together and/or raising his chin. The determination system 130 may also determine the user 115 is experiencing other emotions based on the tones, volumes, pitches, inflections, timbres, and speeds of the speech of the user 115 and based on the facial features, such as the positioning of the lips, eyebrows, eyes, chin, nostrils, nose, and/or ears of the user 115.

In some embodiments, the determination system 130 may develop a machine learning model that may be used to determine the accuracy of the transcription that uses as an input the emotion of the user 115, the images of the user 115, and/or external factors or content of the communication session as described above. In these and other embodiments, the determination system 130 may use the machine learning model to determine the accuracy of the transcription.

In some embodiments, the determination system 130 may be configured to determine the accuracy of the transcription based on the transcription. For example, the determination system 130 may determine the accuracy of a first portion of the transcription based on a second portion of the transcription that is correctly transcribed.

For example, the determination system 130 may determine that the first portion of the transcription includes inaccuracies based on the second portion of the transcription including accurately transcribed words that may reflect on the accuracy of the first portion of the transcription. In these and other embodiments, the determination system 130 may not determine the accuracy of the first portion of the transcription through analysis of the first portion of the transcription. Rather, the determination system 130 may infer the accuracy of the first portion of the transcription based on the meaning of words accurately transcribed in the second portion of the transcription.

In some embodiments, the determination system 130 may determine that the transcription is inaccurate based on the frequency of occurrence of the accurately transcribed words that may reflect on the accuracy of the first portion of the transcription. For example, when a frequency of occurrence of the words is above a threshold, the determination system 130 may determine that the transcription is inaccurate.

For example, the determination system 130 may identify words indicating a lack of understanding in the speech of the user 115 in the transcription. For example, the user 115 may use question words, make requests for the third-party user 145 to repeat portions of the third-party user 145's speech or to alter sound characteristics of the speech, or may apologize. For example, the determination system 130 may identify that the user 115 responds "what" to phrases made by the third-party user 145. Alternatively, the user 115 may respond with other question words such as "when," "where," "how," "why," "who," or "whom." Such words and similar words may indicate a lack of understanding on the part of the user 115. Additionally, in some embodiments, the determination system 130 may identify requests made by the user 115 for the third-party user 145 to repeat portions of the speech of the third-party user 145 or to alter the sound characteristics of the speech. These requests may include phrases such as "could you repeat that," "I didn't understand," "come again," can you please say that again," "could you speak louder," "speak up, please," "could you talk slower," or similar phrases. Alternatively or additionally, the user 115 may apologize. Apologies may include phrases such as "I'm sorry," "forgive me," and other phrases. The determination system 130 may identify the words using a matching algorithm that looks for the words in the transcription that match words in a database that indicate a lack of understanding, such as the words identified above. Alternately or additionally, the determination system 130 may identify words indicating a lack of understanding in the speech of the user 115 using artificial intelligence such as, for example, HMM, DTW-based speech recognition, neural networks, deep feedforward and recurrent neural networks, or other algorithms.

Another example of words that may indicate a lack of understanding in the speech of the user 115 in the transcription may include the third-party user 145 repeating words or phrases during the communication session. For example, the third-party user 145 may repeat the same phrase multiple times or may repeat similar phrases multiple times, which may indicate the third-party user 145 thinks the user 115 does not understand what the third-party user 145 is saying. In these and other embodiments, the determination system 130 may identify repeated words or phrases by maintaining history of the words or phrases for a period of time, such as words or phrases that occur over the last ten, fifteen, twenty, thirty, or more seconds of a communication session. The determination system 130 may compare the words in the history to determine if the words are repeated.

The determination system 130 may also obtain sound characteristics of the speech of the third-party user 145. The third-party user 145 may alter their speech based on a perception of whether the user 115 understands the third-party user 145. For example, the third-party user 145 may speak more slowly in an effort to increase the perceived understanding of the user 115. Alternatively, the third-party user 145 may speak at a higher volume. Alternatively or additionally, the third-party user 145 may speak more slowly and at a higher volume. The determination system 130 may identify the sound characteristics of the speech of the third-party user 145 in an analogous manner as the identifying sound characteristics of the speech of the user 115. The determination system 130 may determine an accuracy of the transcription using the sound characteristics of the speech of the third-party user 145 in an analogous manner as determining an accuracy of the transcription using the sound characteristics of the speech of the user 115.

In some embodiments, the determination system 130 may correlate the words indicating a lack of understanding and the sound characteristics of the speech with particular words and/or phrases in the transcription of the communication session and determine that specific portions of the transcription are not accurate. For example, if the sound characteristics of the speech associated with frustration and confusion and the words indicating a lack of understanding begin at a first particular time and end at a second particular time during the communication session, the determination system 130 may determine the transcription is not accurate between the first particular time and the second particular time.

In some embodiments, the determination system 130 may determine a topic of the communication session. In these and other embodiments, the determination system 130 may determine the topic of the communication session by parsing the transcription into terms and identifying terms of prominence based on a prominence score for each of the terms. The terms with higher prominence may be provided to a machine learning model that may output the topic with a particular confidence score. In some embodiments, a topic with a particular confidence score above a threshold may be used by determination system 130.

In some embodiments, the determination system 130 may also determine an expected emotion for the user 115 based on the topic of the communication session. For example, the determination system 130 may consult a look-up table that associates topics with expected emotions. Some topics of conversation may generally elicit particular emotional responses from individuals. For example, if the third-party user 145 is sharing news regarding cancer, death, or bad health with the user 115, the user 115 may be sad or frustrated. Alternatively or additionally, if the third-party user 145 is sharing news regarding a reward, job offer, or new purchase with the user 115, the user 115 may be happy. The expected emotion may change during the course of the communication session. For example, the third-party user 145 and the user 115 may begin a communication session with greetings which may generally be associated with positive emotions. The third-party user 145 may then share unfortunate news with the user 115 and the expected emotion for the user 115 may be surprise or sadness. Later, the third-party user 145 may share positive news with the user 115 and the expected emotion for the user 115 may be joy. In these and other embodiments, the determination system 130 may determine an expected emotion for the user 115 at multiple times during the communication session.

The determination system 130 may further determine an unexpected emotion for the user 115. The unexpected emotion may be a measure of the difference between the emotion the user 115 experiences and the emotion the user 115 would be expected to experience based on the topic of the communication session. For example, the third-party user 145 may share positive news with the user 115 such that the user 115 would be expected to experience joy but the user 115 may actually experience frustration. The determination system 130 may determine that the frustration the user 115 is experiencing is an unexpected emotion not associated with the topic of the communication session. In these and other embodiments, the determination system 130 may attribute the unexpected emotion to accuracy of the transcription of the communication session.

In some embodiments, the unexpected emotion may be calculated based on assigning each of the emotions a score. The scores of similar emotions may be the same or similar. For example, joy and happy may assigned a score of six, content and mellow may be assigned a score of three, and frustrated, sad, and mad may be assigned a score of zero. When a difference between the emotion the user 115 experiences and the emotion the user 115 would be expected to experience is greater than three, the determination system 130 may determine that the transcription is inaccurate.

In some embodiments, the determination system 130 may further determine whether the user 115 is viewing the transcription. For example, in some embodiments, the camera 150 may be positioned to record images of the user 115. In these and other embodiments, the determination system 130 may use images from the camera 150 for eye-tracking to determine whether the eyes of the user 115 are directed to a location on a screen of the user device 110 where the transcription may be presented. In response to determining that the eyes of the user 115 are not directed at the transcription, the determination system 130 may determine the user 115 is not viewing the transcription. In response to determining the user 115 is not viewing the transcription, the determination system 130 may determine the factors discussed in this disclosure, such as the words of the user 115 indicating a lack of understanding, the sound characteristics of the speech of the third-party user 145, and/or the experienced emotion of the user 115 are not related to the accuracy of the transcription. In these and other embodiments, the determination system 130 may determine the user 115 is directing the eyes of the user 115 at the transcription when the user 115 directs the eyes toward the transcription at a particular frequency or over a particular period of time. For example, the user 115 may periodically look away from the transcription, such as in response to an outside noise or to look at an image displayed on the user device 110, and may still be determined to be viewing the transcription.

In some embodiments, the determination system 130 may determine that the user 115 is viewing the transcription during a first duration of time based on determining that the eyes of the user 115 are directed at the transcription during the first duration of time and may determine that the user 115 is not viewing the transcription during a second duration of time based on determining that the eyes of the user 115 are not directed at the transcription during the second duration of time. In these and other embodiments, the determination system 130 may determine the factors discussed in this disclosure are related to the accuracy of the transcription during the first duration of time but not during the second duration of time.

In some embodiments, the determination system 130 may determine accuracy of transcription based on a combination of the factors discussed in this disclosure. For example, factors may include sound characteristics of the speech of the user 115, the expected emotion of the user 115, the words of the user 115 indicating a lack of understanding, the sound characteristics of the speech of the third-party user 145, and/or the repeated words of the third-party user 145. In some embodiments, the determination system 130 may train a machine learning model using these factors. The machine learning model may output an indication of whether the transcription is accurate. For example, the machine learning model using one or more of the factors discussed above may classify a transcription of the audio, which results in the factors provided to the model, as accurate or inaccurate. Furthermore, the machine learning model may classify portions of a transcription of the audio as accurate or inaccurate. For example, a first portion of the transcription may result from a first portion of audio from a communication session. The first portion of the transcription and the first portion of the audio may results in first factors that may result in the classification of the first portion of the transcription as accurate. A second portion of the transcription may result from a second portion of audio from the communication session. The second portion of the transcription and the second portion of the audio may results in second factors that may result in the classification of the second portion of the transcription as inaccurate.

Modifications, additions, or omissions may be made to the environment 100 without departing from the scope of the present disclosure. For example, in some embodiments, the determination system 130 and the transcription system 160 may be one system. Alternatively or additionally, in some embodiments, the environment 100 may not include the camera 150. Alternately or additionally, the determination system 130 may be included in the user device 110 or the third-party user 145. Alternately or additionally, the determination system 130 may be distributed across multiple devices such as the user device 110 and the transcription system 160.

Figure 2:
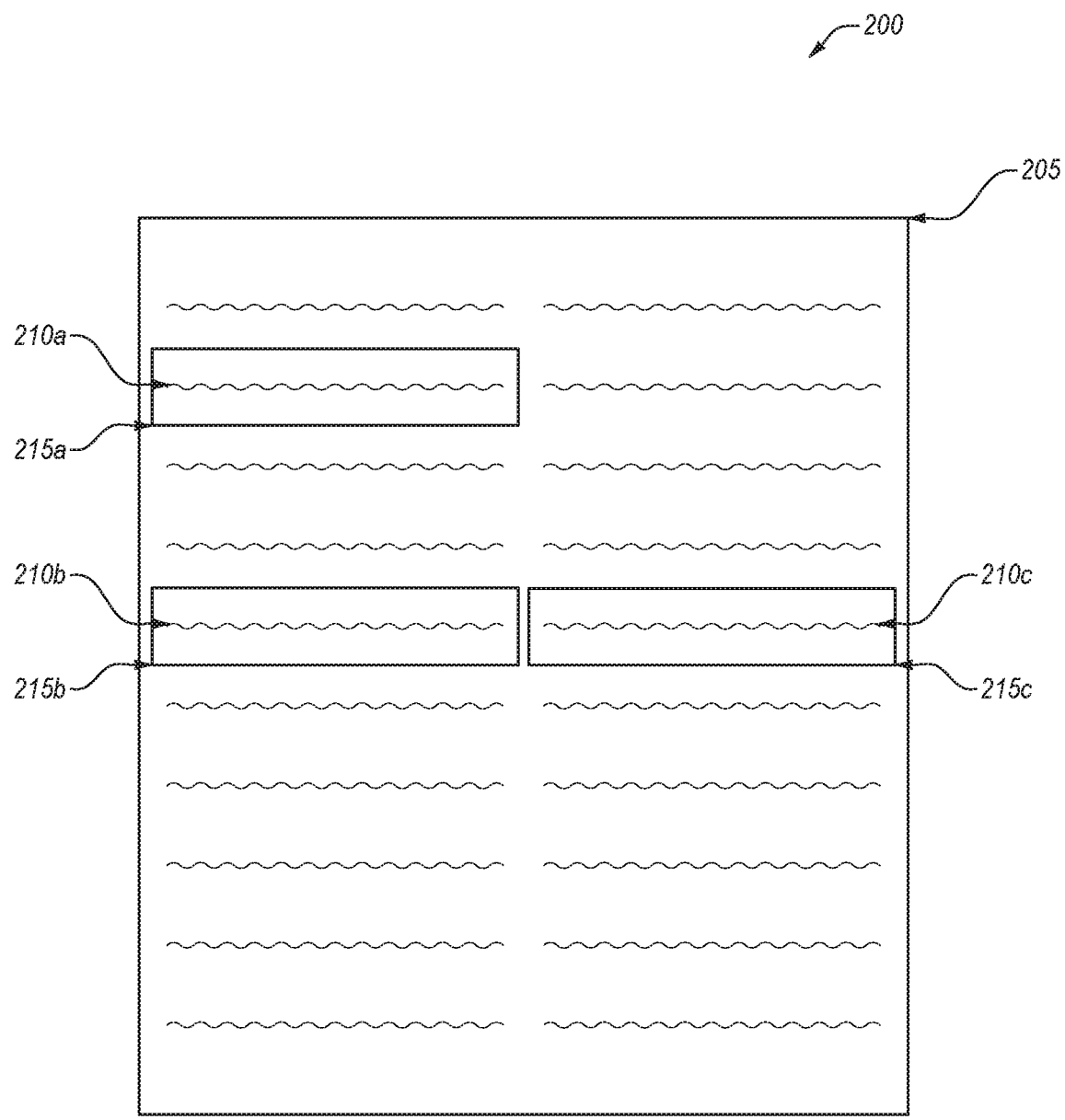
FIG. 2 illustrates an example verified transcription.

FIG. 2 illustrates an example verified transcription 200 of a communication session. The verified transcription 200 may include multiple lines of text 205. In some embodiments, the lines of text 205 may be generated by a transcription system such as the transcription system 160 of FIG. 1. The lines of text 205 may correspond with the words of the speech of the user 115 and/or the third-party user 145 of FIG. 1. In some embodiments, a determination system, such as the determination system 130 of FIG. 1, may verify the accuracy of the lines of text 205. In these and other embodiments, the determination system may identify multiple portions 210*a*, 210*b*, and 210*c* of the text that are not accurate. In these and other embodiments, the verified transcription 200 may include boxes 215*a*, 215*b*, and 215*c* surrounding the portions 210*a*, 210*b*, and 210*c*. Alternatively or additionally, in some embodiments, the boxes 215*a*, 215*b*, and 215*c* may include highlighting, underlining, italicizing, bolding, increasing a font size, or other alterations to the formatting of the portions 210*a*, 210*b*, and 210*c*.

In some embodiments, the lines of text 205 of a transcription may be generated by a transcription system. In these and other embodiments, a determination system, such as the determination system 130 of FIG. 1, may provide the verified transcription 200 to the transcription system. In some embodiments, the determination system may provide the verified transcription 200 to the transcription system in real-time, i.e., during the course of a communication session. In these and other embodiments, the verified transcription 200 may facilitate the transcription system in identifying areas for improvement in the transcribing of the contemporaneous communication session and for improvement of future transcriptions.

Modifications, additions, or omissions may be made to the verified transcription 200 without departing from the scope of the present disclosure. For example, in some embodiments, the lines of text 205 may be presented in a single column. Alternatively or additionally, in some embodiments, the lines of text 205 may also include an identity of a speaker of the lines of text 205.

Figure 3:
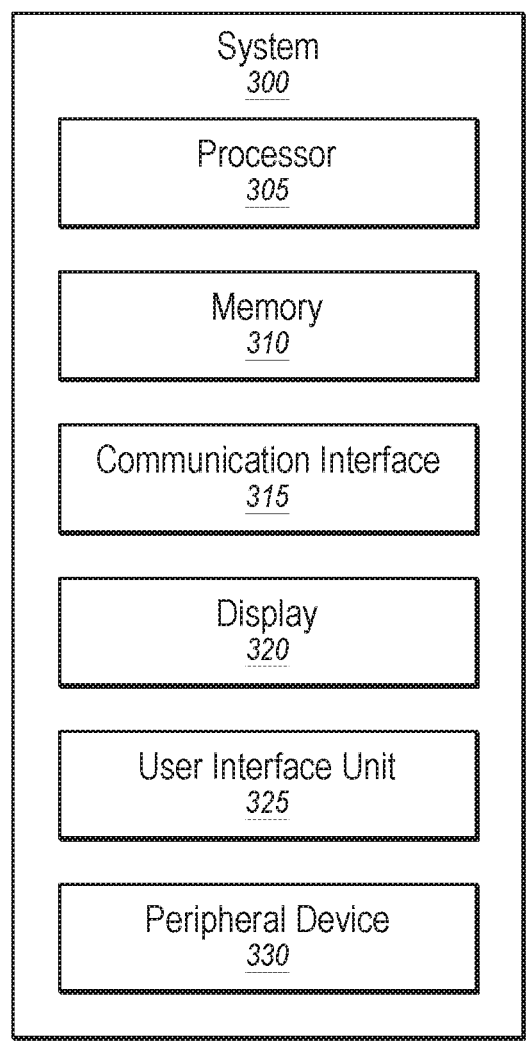
FIG. 3 illustrates an example communication device that may be used to verify transcriptions of a communication session.

FIG. 3 illustrates an example communication device 300 that may be used in verifying transcriptions of communication sessions. The communication device 300 may be arranged in accordance with at least one embodiment described in the present disclosure. The communication device 300 may include a processor 305, a memory 310, a communication interface 315, a display 320, a user interface unit 325, and a peripheral device 330, which all may be communicatively coupled. In some embodiments, the communication device 300 may be part of any of the systems or devices described in this disclosure. For example, the communication device 300 may be part of any of the user device 110, the determination system 130, the third-party device 140, the camera 150, and the transcription system 160 of FIG. 1. In some embodiments, the communication device 300 may be part of a phone console.

Generally, the processor 305 may include any suitable special-purpose or general-purpose computer, computing entity, or processing device including various computer hardware or software modules and may be configured to execute instructions stored on any applicable computer-readable storage media. For example, the processor 305 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 3, it is understood that the processor 305 may include any number of processors distributed across any number of networks or physical locations that are configured to perform individually or collectively any number of operations described herein. In some embodiments, program instructions may be loaded into the memory 310. In these and other embodiments, the processor 305 may interpret and/or execute program instructions and/or process data stored in the memory 310. For example, the communication device 300 may be part of the user device 110, the determination system 130, the third-party device 140, the camera 150, and the transcription system 160 of FIG. 1. In these and other embodiments, the program instructions may include the processor 305 processing a transcription of a communication session and verifying its accuracy.

The memory 310 may include computer-readable storage media for carrying or having computer-executable instructions or data structures stored thereon. Such computer-readable storage media may be any available media that may be accessed by a general-purpose or special-purpose computer, such as the processor 305. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 305 to perform a certain operation or group of operations, such as one or more blocks of the method 400. Additionally or alternatively, in some embodiments, the instructions may be configured to cause the processor 305 to perform the operations of the environment 100 of FIG. 1 to verify transcriptions of a communication session. In these and other embodiments, the processor 305 may be configured to execute instructions to verify the transcription of a communication session.

The communication interface 315 may include any component, device, system, or combination thereof that is configured to transmit or receive information over a network. In some embodiments, the communication interface 315 may communicate with other devices at other locations, the same location, or even other components within the same system. For example, the communication interface 315 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication interface 315 may permit data to be exchanged with a network and/or any other devices or systems described in the present disclosure.

The display 320 may be configured as one or more displays, like an LCD, LED, or other type display. The display 320 may be configured to present video, text transcriptions, user interfaces, and other data as directed by the processor 305.

The user interface unit 325 may include any device to allow a user to interface with the communication device 300. For example, the user interface unit 325 may include a mouse, a track pad, a keyboard, a touchscreen, a telephone switch hook, a telephone keypad, volume controls, and/or other special purpose buttons, among other devices. The user interface unit 325 may receive input from a user and provide the input to the processor 305.

The peripheral device 330 may include one or more devices. For example, the peripheral devices may include a microphone, a camera, and/or a speaker, among other peripheral devices. In these and other embodiments, the microphone may be configured to capture audio. The imager may be configured to capture digital images. The digital images may be captured in a manner to produce video or image data. In some embodiments, the speaker may play audio received by the communication device 300 or otherwise generated by the communication device 300. In some embodiments, the processor 305 may be configured to process audio signals and improve a signal-to-noise ratio of the audio signals, which may help reduce noise in the audio output by the speaker.

Modifications, additions, or omissions may be made to the communication device 300 without departing from the scope of the present disclosure.

Figure 4:
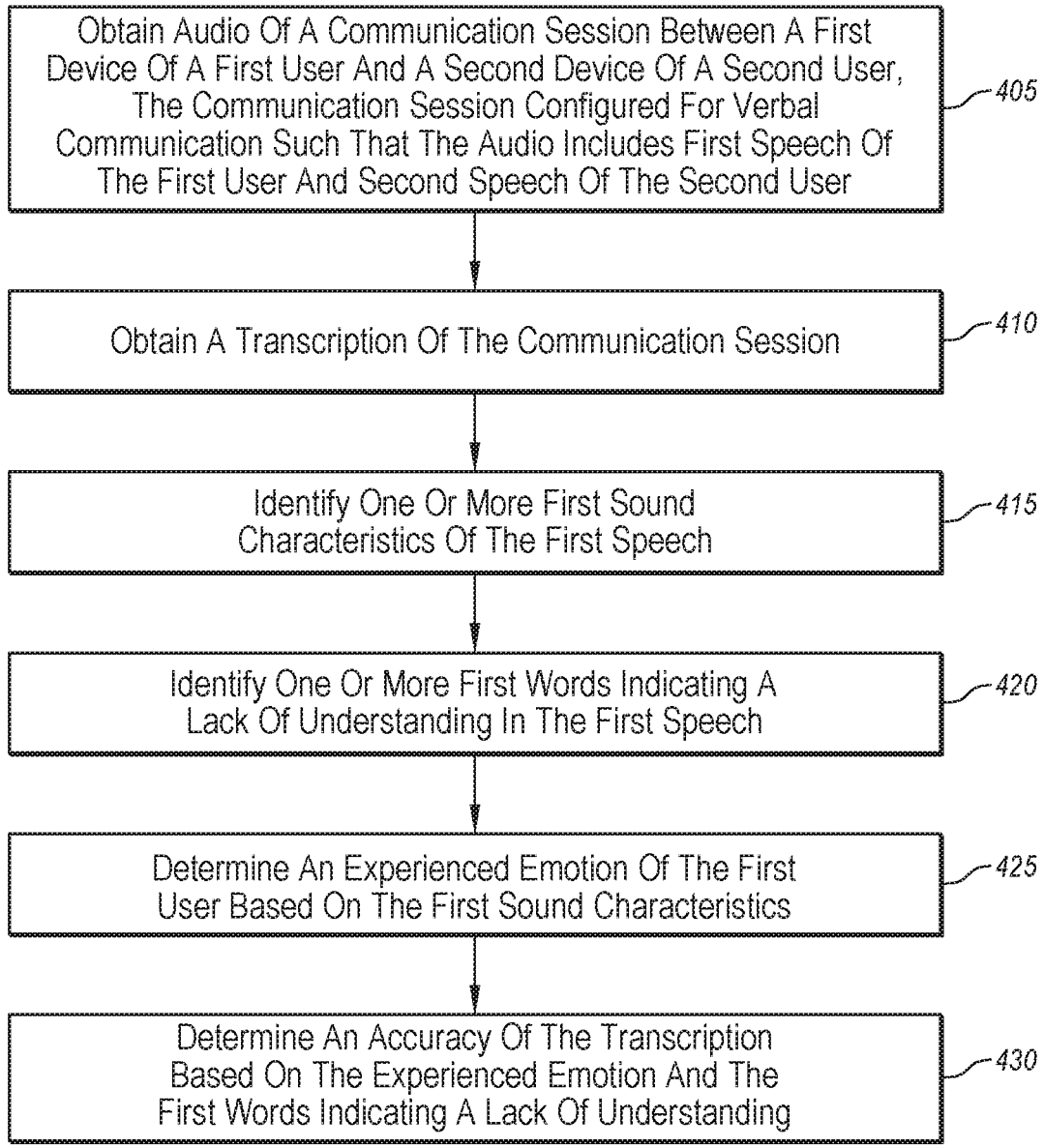
FIG. 4 is a flowchart of an example computer-implemented method to detect accuracy of transcriptions of a communication session.

FIG. 4 is a flowchart of an example computer-implemented method to verify transcriptions of a communication session. The method 400 may be arranged in accordance with at least one embodiment described in the present disclosure. The method 400 may be performed, in whole or in part, in some embodiments, by a system and/or environment, such as the environment 100 and/or the communication device 300 of FIGS. 1 and 3, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 405, where audio of a communication session between a first device of a first user and a second device of a second user may be obtained. The communication session may be configured for verbal communication such that the audio includes first speech of the first user and second speech of the second user. In block 410, a transcription of the communication session may be obtained. In some embodiments, the transcription may be a transcription of the second speech of the second user.

In block 415, one or more first sound characteristics of the first speech may be identified. In some embodiments, the first sound characteristics may include a tone, a volume, a pitch, an inflection, a timbre, or a speed of the first speech. In block 420, one or more first words indicating a lack of understanding may be identified in the first speech. In some embodiments, the first words indicating a lack of understanding may include requests for the second user to repeat one or more portions of the second speech, question words, and apologies.

In block 425, an experienced emotion of the first user may be determined based on the first sound characteristics. In block 430, an accuracy of the transcription may be determined based on the experienced emotion and the first words indicating a lack of understanding.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks. For example, the method 400 may include identifying one or more second sound characteristics of the second speech may be identified. In some embodiments, the second sound characteristics may include an increasing volume of the second speech or a decreasing speed of the second speech. The method 400 may also include identifying one or more repeated words in the second speech. In these and other embodiments, the accuracy of the transcription may be determined based on the experienced emotion, the first words indicating a lack of understanding, the second sound characteristics, and the repeated words.

Alternatively or additionally, in some embodiments, the method 400 may include obtaining image data of the communication session between the first device and the second device. The image data may include images of the first user. The method 400 may further include identifying one or more facial expressions of the first user in the image data. In these and other embodiments, the experienced emotion may be determined based on the first sound characteristics and the facial expressions. In some embodiments, the method 400 may include determining a first topic of the communication session. The method may also include identifying an expected emotion for the first user based on the first topic. The method may further include determining an unexpected emotion based on the expected emotion and the experienced emotion. In these and other embodiments, the accuracy of the transcription may be determined based on the unexpected emotion and the first words. In some embodiments, the method 400 may include determining the accuracy of the transcription based on the unexpected emotion, the first words, the second sound characteristics, and the repeated words.

As indicated above, the embodiments described herein may include the use of a special purpose or general purpose computer (e.g., the processor 305 of FIG. 3) including various computer hardware or software modules. Further, as indicated above, embodiments described herein may be implemented using computer-readable media (e.g., the memory 310 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising: obtaining audio of a communication session between a first device of a first user and a second device of a second user, the communication session configured for verbal communication such that the audio includes first speech of the first user and second speech of the second user;

obtaining a transcription of the second speech of the second user;

identifying one or more first sound characteristics of the first speech of the first user;

identifying one or more first words in the transcription indicating the first user lacks understanding of the second speech;

based on the one or more first sound characteristics, determining an experienced emotion of the first user; and based on the experienced emotion and the one or more first words, determining an accuracy of the transcription of the second speech.

2. The method of claim 1, wherein the first sound characteristics of the first speech include: a tone, a volume, a pitch, an inflection, a timbre, or a speed of the first speech.

3. The method of claim 1, further comprising:

obtaining a second transcription of the first speech of the first user; and identifying one or more second words in the second transcription indicating the first user lacks understanding of the second speech, wherein the accuracy of the transcription of the second speech is determined further based on the second words.

4. The method of claim 1, further comprising:

identifying one or more second sound characteristics of the second speech, wherein determining the accuracy of the transcription of the second speech is further based on the one or more second sound characteristics.

5. The method of claim 1, further comprising:

obtaining image data of the communication session between the first device of the first user and the second device of the second user, the image data including images of the first user; and identifying one or more facial expressions of the first user in the image data, wherein determining the experienced emotion of the first user is further based on the one or more facial expressions.

6. The method of claim 5, further comprising:

determining, based on the image data, the first user is not viewing the transcription during a first duration of time; and determining, based on the image data, the first user is viewing the transcription during a second duration of time, wherein determining the accuracy of the transcription of the second speech comprises determining the accuracy of the transcription during the second duration of time but not during the first duration of time.

7. The method of claim 1, further comprising:

determining a first topic of the communication session;

based on the first topic, identifying an expected emotion for the first user; and based on the expected emotion and the experienced emotion, determining an unexpected emotion of the first user, wherein determining the accuracy of the transcription of the second speech is further based on the unexpected emotion.

8. A method comprising:

obtaining audio of a communication session between a first device of a first user and a second device of a second user, the communication session configured for verbal communication such that the audio includes first speech of the first user;
obtaining a transcription of the communication session;
determining a first topic of the communication session;
based on the first topic, identifying an expected emotion for the first user;
obtaining one or more first sound characteristics of the first speech;
based on the one or more first sound characteristics, determining an experienced emotion of the first user;
based on the expected emotion and the experienced emotion, determining an unexpected emotion of the first user; and
based on the unexpected emotion, determining an accuracy of the transcription.

9. The method of claim 8, wherein the first sound characteristics of the first speech include: a tone, a volume, a pitch, an inflection, a timbre, or a speed of the first speech.

10. The method of claim 8, wherein the audio further includes second speech of the second user and the method further comprises:
identifying one or more first words indicating a lack of understanding in the first speech; identifying one or more second sound characteristics of the second speech; and
identifying one or more repeated words in the second speech,
wherein determining the accuracy of the transcription is further based on the one or more first words, the one or more second sound characteristics, and the one or more repeated words.

11. The method of claim 10, wherein the first words indicating a lack of understanding include: requests for the second user to repeat one or more portions of the second speech, question words, and apologies.

12. The method of claim 10, wherein the one or more second sound characteristics of the second speech include: an increasing volume or a decreasing speed of the second speech.

13. The method of claim 8, further comprising:
obtaining image data of the communication session between the first device of the first user and the second device of the second user, the image data including images of the first user; and
identifying one or more facial expressions of the first user in the image data,
wherein determining the experienced emotion of the first user is further based on the one or more facial expressions.

14. A system comprising: one or more processors; and one or more non-transitory computer-readable media configured to store instructions that in response to being executed by the one or more processors cause the system to perform operations, the operations comprising:
obtaining audio of a communication session between a first device of a first user and a second device of a second user, the communication session configured for verbal communication such that the audio includes first speech of the first user and second speech of the second user;
obtaining a transcription of the second speech of the second user;
identifying one or more first sound characteristics of the first speech of the first user;
identifying one or more first words in the transcription indicating the first user lacks understanding of the second speech;
based on the one or more first sound characteristics, determining an experienced emotion of the first user; and
based on the experienced emotion and the one or more first words, determining an accuracy of the transcription of the second speech.

15. The system of claim 14, wherein the first sound characteristics of the first speech include: a tone, a volume, a pitch, a timbre, and a speed of the first speech.

16. The system of claim 14, wherein the operations further comprise:
obtaining a second transcription of the first speech of the first user; and
identifying one or more second words in the second transcription indicating the first user lacks understanding of the second speech,
wherein the accuracy of the transcription of the second speech is determined further based on the second words.

17. The system of claim 14, wherein the operations further comprise:
identifying one or more second sound characteristics of the second speech; and
wherein determining the accuracy of the transcription of the second speech is further based on the one or more second sound characteristics.

18. The system of claim 17, wherein the one or more second sound characteristics of the second speech include: an increasing volume of the second speech or a decreasing speed of the second speech.

19. The system of claim 14, wherein the operations further comprise: obtaining image data of the communication session between the first device of the first user and the second device of the second user, the image data including images of the first user; and
identifying one or more facial expressions of the first user in the image data,
wherein determining the experienced emotion of the first user is further based on the one or more facial expressions.

20. The system of claim 14, wherein the operations further comprise: determining a first topic of the communication session;
based on the first topic, identifying an expected emotion for the first user; and
based on the expected emotion and the experienced emotion, determining an unexpected emotion of the first user,
wherein determining the accuracy of the transcription of the second speech is further based on the unexpected emotion.

* * * * *